Patented Oct. 26, 1948

2,452,200

UNITED STATES PATENT OFFICE 2,452,200

TREATMENT OF POROUS MATERIAL

Hamline M. Kvalnes and Franklin S. Chance, Wilmington, Del., assignors to E. I. du Pont de Nemours & Company, Wilmington, Del., a corporation of Delaware No Drawing. Application April 16, 1945, Serial No. 588,720

5 Claims. (Cl. 117—148)

This invention relates to the treatment of porous materials such as wood, and more particularly to a method for inhibiting dimensional changes therein induced by moisture and exposure.

Until very recently, attempts to reduce the adverse effects of moisture upon wood, especially shrinkage and swelling, by treatment with urea-formaldehyde reaction products have not led to successful results (Ind. Eng. Chem., 28, 1936, 1165). However, important progress has been made within the past few years, with the result that attractive, hard-surfaced wood products having dimensional stabilities as high as 40% to 50% recently have been prepared through the application of a wood-impregnating agent containing sesquimethylol urea or dimethylol urea (Kvalnes, S. N. 478,666, filed March 10, 1943, now U. S. Patent 2,398,649; Cadot, S. N. 478,667, filed March 10, 1943, now abandoned; Wood and Paper-Base Plastics, U. S. D. A., Forest Products Laboratory, Nov. 1943; Chem. and Met. Eng., May, 1944, 132; Nature, 153, May 6, 1944, 552; Kvalnes, S. N. 555,042 filed Sept. 20, 1944).

An object of the present invention is to provide further improvements in the hardening and dimensional stabilization of wood. Another object is to provide a wood-impregnating agent having prolonged storage life even in warm climates. Still another object is to provide an improved method for loading the voids of porous material with resins derived from urea and formaldehyde. Other objects will appear hereinafter.

These and other objects are accomplished in accordance with the invention by impregnating wood or other porous materials with a reagent containing as an essential ingredient a member of the class consisting of methyloluron ethers, and substances which give rise to methyloluron ethers upon etherification with alcohols. The latter substances are described in greater detail hereinafter. They are non-resinous urea-formaldehyde reaction products which may be obtained by heating urea with from 4 to 5 moles of formaldehyde per mol of urea in alkaline aqueous solution, and removing water from the reaction mixture at 100° to 200° F. under diminished pressure. They contain from 2.5 to 4.0 mols of formaldehyde per mol of urea, and are converted to N,N'-dimethyloluron dimethyl ether upon etherification with methanol and distillation of the resulting product.

The methyloluron ethers are exemplified by compounds of the type

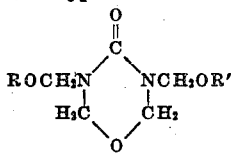

wherein R and R' represent alkyl groups having from 1 to 4 carbon atoms. R and R' may be similar or dissimilar. The methyloluron ethers, or similar non-resinous urea-formaldehyde reaction products containing from 2.5 to 4.0 mols of formaldehyde compound per mol of urea, may be employed in conjuction with urea or a like material containing formaldehyde-reactive hydrogen, (hereinafter called a "hardener"), such as thiourea, melamine, substituted melamines, phenols or mixtures thereof. In preferred embodiments, the amount of hardener admixed with the uron derivative, or other such non-resinous urea-formaldehyde reaction product having from 2.5 to 4.0 mols of combined formaldehyde to combined urea, is sufficient to give a mixture equivalent in total combined urea; formaldehyde ratio of from 1:1 to 1:4. It is frequently convenient to store the said reaction product for long periods, and to add the hardener thereto shortly before use, i. e., within a day or two before actual impregnation. Since melamine and phenol each have 3 active centers in the molecule, urea having only 2, it follows that 0.66 mol of melamine or phenol are stoichiometrically equivalent in hardening action to 1.0 mol of urea.

The wood-impregnating compositions prepared in accordance with this invention are markedly superior to the methylol ureas (which are themselves highly effective, as described in the U. S. Patent 2,398,649), especially because the reagents herein disclosed, when admixed with urea or thiourea as stated above, are very much more soluble in water than the methylol ureas, and accordingly can be used for the impregnation of wood with considerably larger quantities of the impregnating agent, since wood saturated with a concentrated solution of the resin-forming ingredient contains more resin-forming material than wood impregnated with a dilute solution. It is believed that the improvement in dimensional stability which is achieved through the use of the impregnating agents described herein is due in part to the fact that they permit impregnation with a larger quantity of the resin-forming ingredient. Thus, the invention involves the concept that an impregnating composition having the desired urea:formaldehyde ratio, but having a much greater solubility than prior compositions of the same urea:formaldehyde ratio, is obtained by admixing methyloluron ether, or equivalent reagent, as described more fully below, with urea or an equivalent formaldehyde-reactive substance. This increased solubility permits greater loading of the wood voids, for as the concentration of resin-forming ingredients approaches 100%, the percentage of the volume of pores or voids which can be filled in with resin also approaches 100%, with the result that a product having markedly increased dimensional stability is achieved. Moreover, as a result of the fact that the reagent is stable, and soluble in water in all proportions, the resin-forming ingredients after impregnation can slowly, but thoroughly, diffuse through the wood and wet the fibers throughout the entire mass thereof, so that on storage a product containing the impregnating agent throughout the entire bulk of the wood may be obtained, if desired.

As a result of the improvements embodied in the present invention, wood having a dimensional stability of from 70% to 80% and even in some instances as high as 85% or even higher can be obtained. Other advantages in using the herein-described impregnating agent are that it permits the impregnation of wood which cannot otherwise be easily treated because of the difficulty of diffusing methylol-urea solutions therein; also, by reason of the improved dimensional stability, checking and cracking during rapid kiln-drying are greatly reduced or entirely eliminated. Moreover, when high concentrations of the resin-forming ingredients are used, there is proportionately less water to remove during kiln-drying.

The methyloluron ethers which are employed in the practice of the invention may be prepared by any convenient method, such as that described by Kadowaki, Bull. Chem. Soc., Japan 11, 259. The methylolurons themselves have not been isolated heretofore. In accordance with this invention, however, a product, herein referred to as "technical dimethyloluron" can be obtained by heating about 4 to 5 mols of formaldehyde in aqueous solution per mol of urea in the presence of an alkaline catalyst, at elevated temperature, and thereafter removing at least a part of the unreacted formaldehyde, and most of the water, under diminished pressure at the elevated temperature. The residue obtained in this manner generally contains about 3.8 to 4.0 mols of formaldehyde per mol of urea, and is the material referred to herein as "technical dimethyloluron." If a solution of "technical dimethyloluron" is desired, it is preferable not to remove all of the water during the distillation at diminished pressure.

"Technical dimethyloluron" has a unique combination of properties which make it a very valuable reagent for use in the impregnation of wood. It is stable for many months at a pH of about 7 at all temperatures at which it might be stored in commercial practice. It is completely soluble in water in all proportions. The aqueous solutions dissolve surprisingly large amounts of hardeners like thiourea and melamine which normally have a relatively low solubility in water. "Technical dimethyloluron" is a liquid, which can be readily dispensed and handled in commercial operation. Because of these excellent properties it is generally preferred to ship "technical dimethyloluron" separately to the place where it is to be used, and to postpone adding the hardener until shortly before actual application.

The invention is, of course, not limited by any theory as to the chemical constitution of this material, and, while the experimental evidence is indicative of the formula

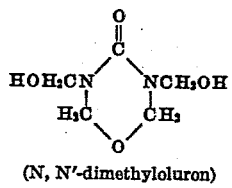

(N, N'-dimethyloluron)

conformity with this structure is considered to be somewhat problematical, and collateral to the invention herein disclosed. It is true, however, that "technical dimethyloluron" has a combined urea and formaldehyde content corresponding closely to dimethyloluron, and also that "technical dimethyloluron" reacts with methanol to form N,N'-dimethyloluron dimethyl ether which is identifiable by boiling point determination. It is probable that the material contains N,N'-dimethyloluron in crude form.

The concentration of solids in the impregnating solution of the invention may be varied over a wide range. The advantages of the invention are preferably realized at relatively high concentrations, preferably about 30% to 95%. The liquid uron derivatives such as dialkyl ethers of dimethyloluron may be employed in the pure or substantially pure form, if desired.

The invention is illustrated further by means of the following examples.

*Example 1.*—A mixture containing 118.5 lbs. (1.42 lb. mols) of 36% aqueous formaldehyde solution (which was free of methanol) was treated with 19 lbs. (0.32 lb. mols) of urea and 0.35 lb. of sodium hydroxide, and the resulting mixture was heated at a temperature of about 190° to 195° F. for about 1.5 hours (pH, initially 10.2). The resultant product was transferred to a vacuum still and was topped under a vacuum of 22 to 24 inches of mercury for 1.75 hours to remove most of the water and part of the unreacted formaldehyde. The distillate weighed 71 lbs., and analyzed 9% formaldehyde. From the amount of formaldehyde recovered it may be calculated that the residue ("technical dimethyloluron") contained 3.8 mols of formaldehyde per mol of urea. The water content of this material was about 15 per cent. It had a density of about 1.27, and a pH of 6.7.

*Example 2.*—The "technical dimethyloluron," prepared in accordance with Example 1, is mixed with water and urea to obtain a solution having a concentration of 30% and a formaldehyde:urea mol ratio of 1.3. Gum sapwood veneers are saturated with this solution by means of a vacuum pressure cycle at a pH of about 6 to 7, and are subsequently dried for 4 hours, final temperature being about 140° F. The resulting product has a dimensional stability of 40%. This experiment when repeated using thiourea in place of urea at a concentration of 50%, gives a product having a dimensional stability of 65%. The latter experiment when repeated with urea in place of thiourea, using a reagent having a concentration of 95% gives a moisture-resistant product having a dimensional stability of 85-95%. Similar results are obtained with melamine, and with phenol in place of the added urea component.

*Example 3.*—A sample of gum sapwood was impregnated with the dimethyl ether of methyloluron by means of a vacuum pressure cycle. The resulting product was heated for about 4 hours at a temperature of about 130° F. The product obtained in this manner had a humidity dimensional stability of greater than 80%, in the range of 25% relative humidity to 80% relative humidity. At both levels of relative humidity, the hygroscopicity of the treated wood was greater than the hygroscopicity of the untreated wood (probably because of the ether groups).

*Example 4.*—"Technical dimethyloluron," prepared as disclosed in Example 1, was mixed with water and thiourea to obtain a solution having a concentration of 50%, and a formaldehyde:(urea and thiourea) ratio of 1.3:1. A portion of this solution was used for vacuum-pressure impregnation of a specimen of maple sapwood two inches thick. The impregnated wood developed no checks during subsequent rapid kiln-drying. Another portion of the solution was used for impregnating gum sapwood veneers. The resulting product was kiln-dried, after which the dimensional stability was measured and found to be 65%. Some of these impregnated veneers were thereafter cured for 1 hour at 212° F., and the modulus of elasticity was determined before and after set; prior to set the modulus was 10% less than that of the untreated wood, but after set it was 15% greater than that of the untreated wood. The modulus of rupture also increased 35%. A few of these impregnated veneers were cured under a pressure of 1500 lbs. per square inch, at a temperature of 300° F. for 20 minutes. The resultant compressively cured veneers had an abrasion resistance 45% greater than that of the untreated wood. After the compressive cure, the specific gravity was 1.40; a parallel experiment with a methylolurea impregnating agent of the same urea:formaldehyde ratio (30% concentration) gave a cured product having a density of only 1.15.

In the foregoing examples the term dimensional stability is used in its usual sense; i. e., dimensional stability is 100 times the ratio of the dimension change of untreated wood minus the dimension change of treated wood divided by the dimension change of the untreated wood. It may be measured between any levels of humidity or moisture content, but unless otherwise stated, it is measured between the oven-dry and water-wet states.

The examples given above are illustrative only, and represent the general method of the invention without defining its limits. Each of the operations (i. e., (1) preparing the agent, (2) impregnation, (3) drying, and (4) curing) can, of course, be carried out under conditions somewhat different from those disclosed in the examples. In the preparation of the "technical dimethyloluron," any convenient concentration of formaldehyde or paraformaldehyde may be employed. Solutions having a concentration of 37% or 60% give excellent results. Formalin may be employed, but the methanol content of ordinary formalin gives rise to etherification of the methylol groups, which is not always desirable, since it retards setting of the resin (cf. Example 3). The initial pH may be controlled by any suitable method, such as by the use of buffers; pH should preferably be about 7 to 10.5 initially and 5 to 10 at the end of the reaction. The heating period in the preparation of the "technical dimethyloluron" may be from zero to 1.0 hour, or longer, at a temperature preferably of about 100° to 200° F. The vacuum distillation may require about zero to 2 hours, or longer, and should give rise to a product having a concentration in water preferably of from 70% to 100%. The "technical dimethyloluron" may be stored for any convenient time before use, if desired.

Impregnation may be accomplished by known methods, such as by prolonged soaking, diffusion under pressure, or by operation of a vacuum-pressure cycle of the kind described in copending application S. N. 555,042. The impregnation is generally conducted at a temperature of 60° F. to 200° F., preferably about 80° to 100° F. for veneers and sapwood in lumber dimensions, and 180° to 200° F. for heartwoods in lumber dimensions. Low temperatures may also be used since the reagent does not tend to crystallize except when cooled to considerably below ordinary room temperature.

After the wood has been impregnated, it may be dried for a period of weeks by standard air-drying procedures used for lumber, or may be heated in a kiln under conditions similar to those employed normally for kiln-drying untreated green wood, or even at higher temperatures to speed up the drying. Temperatures of 100° to 200° F. may be employed, if desired. The preferred drying time varies from 0.5 hour or less for veneers to about 2 weeks or more for stock which has a thickness of 2 inches or more. Very short drying times are sufficient when a highly concentrated solution of the impregnating agent is employed. An alternative method for drying is to air-dry the impregnated wood for a period of time less than that required for completing the drying, and thereafter to heat the stock in a kiln to lower the moisture content to the desired value.

Curing of the dried impregnated product may be carried out either at ordinary pressures, or at pressures up to, or even exceeding the crushing strength of the wood. Temperatures of about 200° to 350° F. may be employed to effect the cure, the preferred temperature being about 240° to 320 F. While curing catalysts need not be added to the mixture they may be present, if desired. Any acid-reacting or acid-generating substance may be used for this purpose. However, the acidic constituents of the wood, which may react with materials present in the impregnating solution. generally are depended upon to give rise to a sufficient degree of acidity to catalyze the cure.

While in the foregoing examples the wood that is treated according to the invention is gum sapwood, it will be understood that the process may be employed with other varieties of wood, as exemplified by the sap woods of maple, poplar, birch, pine, and the heartwoods of Douglas fir, Sitka spruce, western hemlock, etc. The invention also contemplates similar impregnation of sawdust, wood flour, grasses, jute, hemp, rattan, reeds, palmetto, Masonite, bagasse, and other forms of woody materials. If desired, the wooden objects may be in the form of veneers, preformed plywood or variously shaped objects such as spools, bobbins, boat ribs, shingles, telephone poles, railway ties, barrel staves, window sashes, automobile and aircraft body parts, filter frames, battery separators, shuttle blocks, drawtwister tubes, bowling pins and the like. In its broader aspects the invention may be applied in the impregnation of porous objects in general, such as paper, cloth, felt, leather, cardboard and the like. It is also useful for plugging the pores or pin-holes in objects made of metals, such as welding seams, and the like.

Since many different embodiments of the invention may be made without departing from the spirit and scope thereof, it will be understood that we do not limit ourselves except as set forth in the following claims.

We claim:

1. The method of loading the voids of uncomminuted porous materials with urea-formaldehyde reaction products which comprises soaking such porous material in an aqueous reagent containing as an essential ingredient a non-resinous urea-formaldehyde reaction product having from 2.5 to 4.0 mols of formaldehyde per mol of urea, said product being characterized in that it gives N,N'-dimethyloluron dimethyl ether upon etherification with methanol, said product being characterized further in that it has been prepared by mixing urea with 4 to 5 moles of aqueous formaldehyde per mole of urea, adjusting the pH of the mixture with alkali to from 7 to 10.5, heating the resulting mixture at a temperature of 100° to 200° F., and distilling water and excess formaldehyde from the resulting product under subatmospheric pressure.

2. The method of loading the voids of uncomminuted porous materials with non-resinous urea-formaldehyde reaction products which comprises soaking such porous material in an aqueous solution containing urea and an ingredient obtained by mixing urea with about 4 to 5 mols of aqueous formaldehyde per mol of urea, adjusting the pH of the mixture with alkali to about 7 to 10.5, heating the resulting mixture at a temperature of about 100° to 200° F., distilling water and excess formaldehyde from the resultant product under subatmospheric pressure until the formaldehyde:urea ratio in the residue is 3.8 to 4.0, the relative quantities of urea and of the said ingredient being such that the mol ratio of free and combined formaldehyde to free and combined urea in the said solution is about 1.3:1, and thereafter drying the resultant impregnated porous material whereby the pores thereof become loaded with urea-formaldehyde reaction products.

3. The process of claim 2 in which the solution of impregnating agent has a concentration of about 30% to 95%.

4. The method of loading with urea-thiourea-formaldehyde reaction products the pores which are normally present in uncomminuted wood which comprises soaking wood in an aqueous solution of a urea-thiourea-formaldehyde composition obtained by mixing urea with about 4 to 5 mols of aqueous formaldehyde per mol of urea, adjusting the pH of the mixture with alkali to about 7 to 10.5, heating the resulting mixture at a temperature of about 100° to 200° F., distilling water and excess formaldehyde from the resultant product under subatmospheric pressure, whereby the pH of the mixture drops to about 6.7 and a non-resinous urea-formaldehyde reaction product containing about 3.8 to 4.0 mols of formaldehyde per mol of urea is obtained, said reaction product being characterized in that it is stable on storage for prolonged periods, and admixing the said reaction product with sufficient thiourea to give a mixture having a mol ratio of formaldehyde to urea and thiourea of 1.3:1, and thereafter drying the resultant impregnated wood.

5. The process of claim 4 in which the solution of impregnating agent has a concentration of about 50%.

HAMLINE M. KVALNES.
FRANKLIN S. CHANCE.

REFERENCES CITED

The following references are of record in the file of this patent:

UNITED STATES PATENTS

| Number | Name | Date |
| --- | --- | --- |
| 1,650,274 | Howald | Nov. 22, 1927 |
| 2,056,458 | Howald | Oct. 6, 1936 |
| 2,150,697 | Nevin | Mar. 14, 1939 |
| 2,192,129 | Ellis | Feb. 27, 1940 |
| 2,203,641 | Kapp | June 4, 1940 |
| 2,373,135 | Maxwell | Apr. 10, 1945 |
| 2,374,647 | Burke et al. | May 1, 1945 |